May 28, 1963 K. S. GOODALE 3,091,409

TAPE STORAGE DEVICE

Filed Dec. 29, 1960 4 Sheets-Sheet 1

KENNETH S. GOODALE
INVENTOR.

BY Robert S. Clay

ATTORNEY

May 28, 1963 K. S. GOODALE 3,091,409

TAPE STORAGE DEVICE

Filed Dec. 29, 1960 4 Sheets-Sheet 2

KENNETH S. GOODALE
INVENTOR.

BY Robert G. Clay
ATTORNEY

May 28, 1963 K. S. GOODALE 3,091,409

TAPE STORAGE DEVICE

Filed Dec. 29, 1960 4 Sheets-Sheet 3

KENNETH S. GOODALE
INVENTOR.

BY Robert S. Clay

ATTORNEY

May 28, 1963 K. S. GOODALE 3,091,409

TAPE STORAGE DEVICE

Filed Dec. 29, 1960 4 Sheets-Sheet 4

KENNETH S. GOODALE
INVENTOR.

BY Robert S. Clay

ATTORNEY

United States Patent Office 3,091,409

Patented May 28, 1963

3,091,409

TAPE STORAGE DEVICE

Kenneth Stewart Goodale, Los Altos, Calif., assignor to Ampex Corporation, Redwood City, Calif., a corporation of California Filed Dec. 29, 1960, Ser. No. 79,251
10 Claims. (Cl. 242—55.12)

This invention relates to storage devices for use with magnetic tape recorders, and particularly to devices for storing tape in a running loop under tension.

Magnetic tape recorders that are used as memory and information storage devices for high speed computers must be capable of moving tape at very high accelerations in the vicinity of the recording and reading transducers. Fast operating speeds and quick starts, stops and reversals are required. The inertia of the tape reels, particularly when loaded with the bulk of the tape, is so great that ordinary reel driving apparatus cannot produce the quick responses demanded, not to speak of meeting other requirements, such as that of maintaining constant tension in the tape to prevent tape breakage and to prevent the phenomena known as "flutter" and "wow." Accordingly, it has been customary to provide means for storing the tape in a pair of loops on either side of the transducing heads, and between the heads and the reels, so that the low-mass segment of tape actually in contact with the heads can be quickly accelerated when the occasion demands and the reels can be moved to respond as quickly as they are able, though lagging behind. Thus, the difference in the acceleration rates between the tape and reels is taken up temporarily by the loops, which accordingly lengthen and shorten.

It has been known to provide tape storage loops by means of air pressure-suction devices which maintain the desired tension in the tape even though parts of the tape are accelerating at different rates. But in such devices the length of the loop is usually limited by the physical dimensions of the recording machine, because the loop is required to be extended generally in a straight line and cannot be "folded." Ordinarily, if the loop is folded the shanks of the loop are caused to collapse and to upset the delicate pressure balance that is required for properly tensioning the tape. Also, since the operation of the reels in response to changes of tape speed is usually controlled through pneumatic sensing of the pressures at various points in the loop chamber, which sensing provides an indication of the loop length and speed and direction of movement, it is obvious that changes in the pressure relationships such as would be caused by folding the loop would result in false signals being sent to the reels and would destroy the coordination that is needed between the reel movement and the tape movement.

As a result, if the tape loop cannot be folded, the length of the loop is limited; and this limitation becomes in turn a limitation upon the speed at which the tape can be run in the machine, for it is obvious that the degree of reel-to-tape acceleration differential that may be absorbed by a given length of loop is less when the normal operating speed of the tape is high than when it is low.

Accordingly, it is an object of the present invention to provide a tape storage device fitting within the normal minimal dimensions of a magnetic recording machine and adapting the machine to be operated at unusually high speeds.

It is another object of the invention to provide a tape storage device permitting a greater length of tape to be stored in a loop extending along any limiting dimension of the machine.

It is still another object of the invention to provide a tape storage device adapted for incorporation with standard pneumatic tape-loop sensing means to control the movement of the tape reels.

It is a further object of the invention to provide a tape storage device maintaining tape loop tension at a desired value, and at the same time maintaining the running friction of the tape loop portions with one another and with the walls of the loop chamber at a desired low value.

A tape storage device in accordance with the present invention satisfies the foregoing and other purposes by making use of a tape loop that is folded one or more times along the shanks of the loop. Pneumatic apparatus is provided to keep the loop shanks apart at the folds so that the pressure distribution within the loop is not substantially changed by the folding operation and so that the tape shanks do not rub against one another. The apparatus is adapted to preserve the pressure relationships in the loop even while the head of the loop is being extended or retracted through the zones of fold in response to lengthening or shortening of the loop.

Other objects and advantages will be explained in the following specification, considered together with the accompanying drawings, in which.

Figure 1:
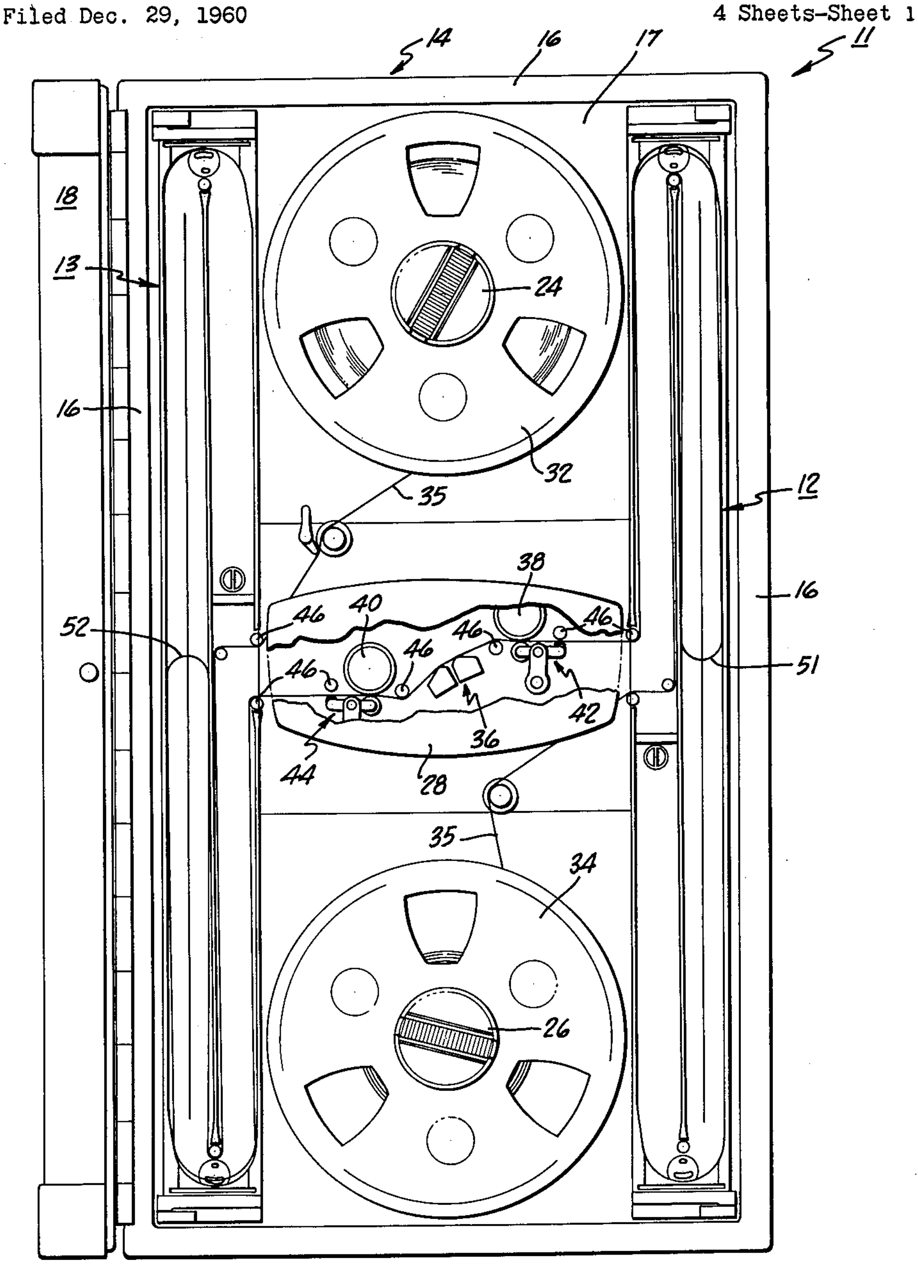
FIGURE 1 is a front elevation view of a tape recorder mounting a pair of tape storage devices constructed in accordance with the invention.

Referring now to FIGURE 1, there is shown a typical high speed magnetic tape recording-reproducing mechanism 11, on which is mounted a pair of tape storage devices 12 and 13 constructed in accordance with the invention. The basic apparatus includes a housing 14 with side walls 16 and a recessed face plate 17 defining a front cavity mounting certain portions of the mechanism for easy access of the operator. A cover door 18 is hinged to one of the side walls 16 to cover the exposed portions of the apparatus when the machine is not in use. A pair of rotating reel hubs 24 and 26 are spaced apart and located at the upper and lower portions of the machine with a capstan and transducer housing 28 located between the hubs 24 and 26. A pair of reels 32 and 34 are normally mounted on the hubs 24 and 26 to store and take-up a tape 35 moved in either forward or reverse direction, respectively, through the housing 28. Within the housing 28 and arranged along the path of the tape, there is disposed a group of magnetic transducers 36, and on either side of the transducers 36 is arranged a pair of capstans 38 and 40 with respectively associated pinch rollers 42 and 44. In normal operation, capstan 38 rotates counterclockwise and capstan 40 at the same time rotates clockwise and the pinch rollers 42 and 44 are controlled to be either both disengaged or alternatively engaged, so that the tape 35 is driven in a "forward" direction by capstan 38 and toward reel 34, or in a "reverse" direction by capstan 40 and toward reel 32. A number of guide rollers 46 are arranged along the tape path to guide the tape. Between capstan 38 and reel 34 the tape is arranged in storage device 12 to define a loop 51; and between capstan 40 and reel 32 the tape is arranged in storage device 13 to define another loop 52.

It will be seen that if, for example, the tape is running in a forward direction at high speed and is being driven by capstan 38 and pinch roller 42, a very slight controlled movement of the pinch roller 42 serves to disengage the tape from its driving engagement with capstan 38 and a corresponding slight movement of pinch roller 44 serves to engage the tape with capstan 40 for substantially instant reversal of the tape motion. The mass of the tape that is stopped and reversed is only that lying between the two loops 51 and 52, so that the period of time necessary for the reversal is very small, on the order of a millisecond. The high-mass, high-inertia reels 32 and 34 together with the tape stored thereon cannot however, be so quickly reversed in rotational direction. Consequently, when such a reversal is made the loop 51 is caused to temporarily grow longer, while the loop 52 is caused to temporarily grow shorter. When the respective reels 32 and 34 have been reversed and have attained a rotational speed in the opposite direction sufficient to supply and take-up the tape at the same or slightly greater velocity at which it is being moved by the capstan 40, the two loops 51 and 52 are caused to re-establish themselves at a normal "null" position, as shown in the drawing, in preparation for the next subsequent stoppage or reversal.

Figure 2:
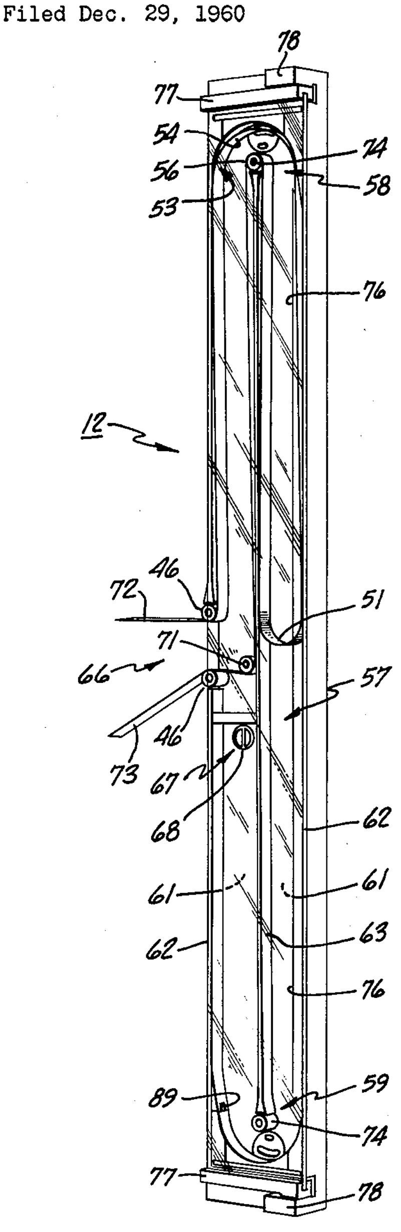
FIGURE 2 is a perspective view of one of the tape storage devices shown in FIGURE 1.

Referring now to FIGURE 2, the storage device 12 is shown with the loop 51 disposed therein. It will be noted that the loop 51 has a well-rounded fold generally indicated by the arrow 53 so as to present an outer folded portion 54 and an inner folded portion 56. To provide this conformation, the device 12 is formed as a pneumatic vessel defining an elongated tape storage channel 57 with a pair of bends 58 and 59. More particularly, the vessel is formed with a pair of opposed flat side walls 61 and 62, the latter being shown as made of transparent material so that the action of the loop in the channel can be continuously observed; and an interior partition 63 defining the channel. The channel has a first open end 66 and a second end 67 in a wall of which is formed a suction opening 68. The opening 68 is connected to a vacuum source (not shown in FIGURE 2) so that a pressure differential is established between the end 67 and the end 66, which is open to the atmosphere. Thus the loop 51 is stretched to its fullest length in the channel 57 and the tape is maintained under constant tension no matter how long or how short the loop becomes.

A guide roller 71 is positioned near the partition 63 and opposite the open end 66 of the channel to keep the shanks 72 and 73 apart at the open end so that the high pressure side of the channel as defined by the interior of the loop 51 forms an unimpeded cavity and the pressure is preserved at a desired value. The upper roller 46, which guides the tape at the upper side of the open channel end 66, is particularly disposed so that it holds the tape away from the adjacent wall of the channel, and the tape extended under pressure actually contacts this wall only at one point where the shank 72 is curved to become the outer folded portion 54. Likewise, the wall of the channel is shaped at the bend 58 so that the shank 72 contacts the wall at only one point where it comes out of the outer folded portion 54 and is extended toward the loop portion 51. In addition, a guide roller 74 is mounted at the end of partition 63 near the center of curvature of the bend 58 to form a frictionless bearing for the inner folded portion 56 of shank 73. The roller 74 is arranged to extend on both sides beyond the width of the partition 63 so that the tape is held away from the partition except at one point at the neck of loop 51.

These features ensure that the tape will have the least possible frictional bearing contact with the sides of the channel during operation. It will be understood that a similar construction is embodied in the vessel at the lower bend 59. Also, for use in association with reel motion regulating apparatus, an elongated slit 76 is formed in the wall 61 and communicating with the channel 57 between the bends 58 and 59. Also, in FIGURE 2 it is shown how the transparent wall 62 is mounted in end pieces 77 and pivoted between projecting portions 78 of the vessel so as to form a swinging lid to the vessel for access to the interior thereof during threading of the tape in the channel 57. It will be understood that when the transparent lid 62 is closed, the contact between the lid and the adjoining walls of the vessel and the partition 63 is sufficiently tight to form substantially a vacuum seal.

Now it will be understood that when the tape loop is formed as described above it is undesirable to have the outer folded portion 54 collapse radially inwardly at the bend so as to come into contact with the inner folded portion 56. Such a collapse, even if only momentary, would disturb the pressure distribution within the loop and would result in unstable and imperfect operation of the machine. Furthermore, the friction that would result between the two oppositely moving shanks of the loop would result in serious damage to the tape. Accordingly, the vessel is formed at each bend with certain novel features, best shown, in FIGURE 3.

Figure 3:
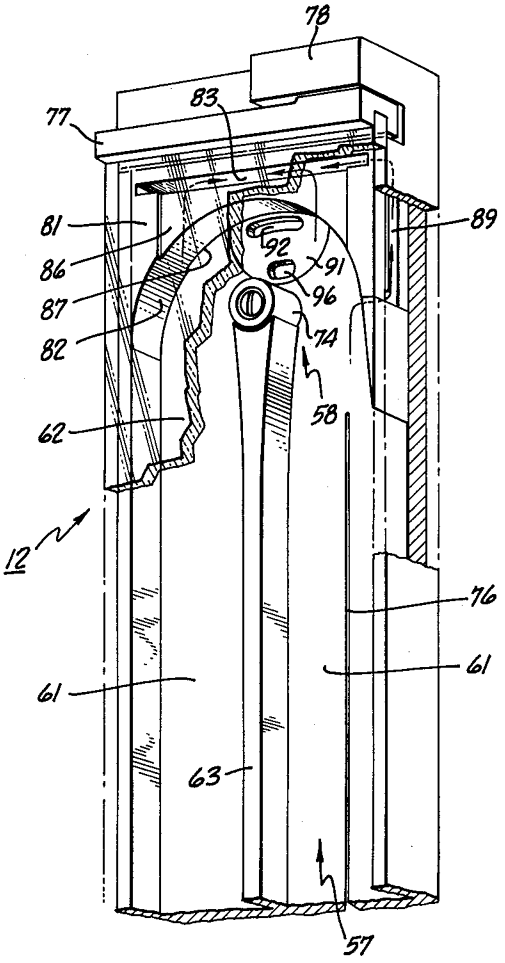
FIGURE 3 is a perspective view, to an enlarged scale, of a portion of the other tape storage device of FIGURE 1.

FIGURE 3 represents an enlarged portion of the upper end of tape storage device 12. It is to be noted that the portion of the channel containing the slit 76 represents the "downstream" side of bend 58, or in other words, the side toward which the tape loop is moving when it is growing longer; and the other portion of the channel represents the "upstream" side of the bend 58. The channel, at the bend 58, is defined by an end member 81 presenting a curved, or arched, wall 82 centered substantially at the axis of the roller 74. The end member 81 has a transverse slot 83 in spaced relation with respect to the wall 82, and is milled to leave a pair of shallow channels 86 and 87 communicating from the slot 83 to the main channel 57 between the body of the end member 81 and the transparent lid 62, and between the body of the end member and the back wall 61. In addition there is formed in end member 81 a further channel 89 communicating between the slot 83 and the curved wall 82 at a point thereon near the downstream side of the bend.

As an important feature of the invention there is provided a pneumatic means for holding the outer folded portion 54 of the tape away from the inner folded portion 56. As shown in FIGURE 3, the side wall 61 has a rotatable inset disk 91 at the outer portion of the bend, and this disk has an elongated and somewhat curved opening 92 formed therein, the curve of the opening being generally on an arc around the center of curvature of the bend so that the curve of the opening 92 follows the curvature of wall 82. The disk is inset at such a location that the opening 92 is spaced substantially away from both the center of curvature of the bend and from the curved wall 82. The disk is mounted for rotation in the wall 61 and is adjustable in rotation so that the alignment of the slot can be very delicately set. The slot 92 is connected to the same source of vacuum as is the end suction opening 68 of the device. Thus, a second pressure differential between atmospheric pressure and a lower value is established, with a gradient decreasing radially outwardly at the bend and toward the slot 92 so that the outer folded portion of the tape is caused to be drawn radially outwardly and away from the inward folded portion of the tape when the shanks of the loop are folded around the bend.

In actual operation, it has been found that the outer folded portion of the tape establishes itself lying lengthwise across the opening 92 so that the vacuum source drawing through the opening 92 is actually drawing from both sides of the outer folded portion of the tape. There is thus a third pressure differential created to decrease along a gradient from a pressure value intermediate atmospheric pressure and that of the vacuum source on the outer side of the outer folded portion of the tape. This third pressure differential is in effect established between the vacuum source and a closed chamber defined by the outer folded portion of the tape, the connecting channels 86 and 87, and the slot 83. The actual difference in pressure between the two faces of the outer folded portion of the tape provides a force on the tape that is equal and opposite to the actual tension existing in the tape as the outer folded portion is pulled away from the curved wall 82. Whenever the tension of the tape increases as a result of action of the recording machine to shorten the tape loop, the exposed area of the portion of the opening 92 that lies on the inner side of the outer folded portion of the tape tends to be decreased and the area of the opening 92 lying on the outer side of the tape tends to be increased so that the second and third pressure differentials are inversely varied and a greater differential force is applied acting radially outward upon the outer folded portion of the tape to balance the increased tape tension. A reverse process takes place when the tension of the tape decreases in response to action of the recording machine to lengthen the tape loop. Consequently, the outer folded portion of the tape under all circumstances maintains itself aligned across the opening 92 and, because the slot 92 is intermediate the inner and outer peripheries of the bend, the outer folded portion of the tape remains spaced away from the wall 82, as well as away from the inner folded portion of the tape, no matter what variations in tape tension take place.

As will be noted, the channel 89 provides a special suction path for holding the downstream side of the outer folded portion of the tape against the corresponding part of the curved wall 82.

As a further feature of the invention the disk 91 also contains a second opening 96, located closer to the center of curvature of the bend. The function of such opening 96, which is connected to atmospheric pressure, is to provide a correction for transient varitations in the signal produced by the pneumatic tape-length sensing means of the device.

Figure 4:
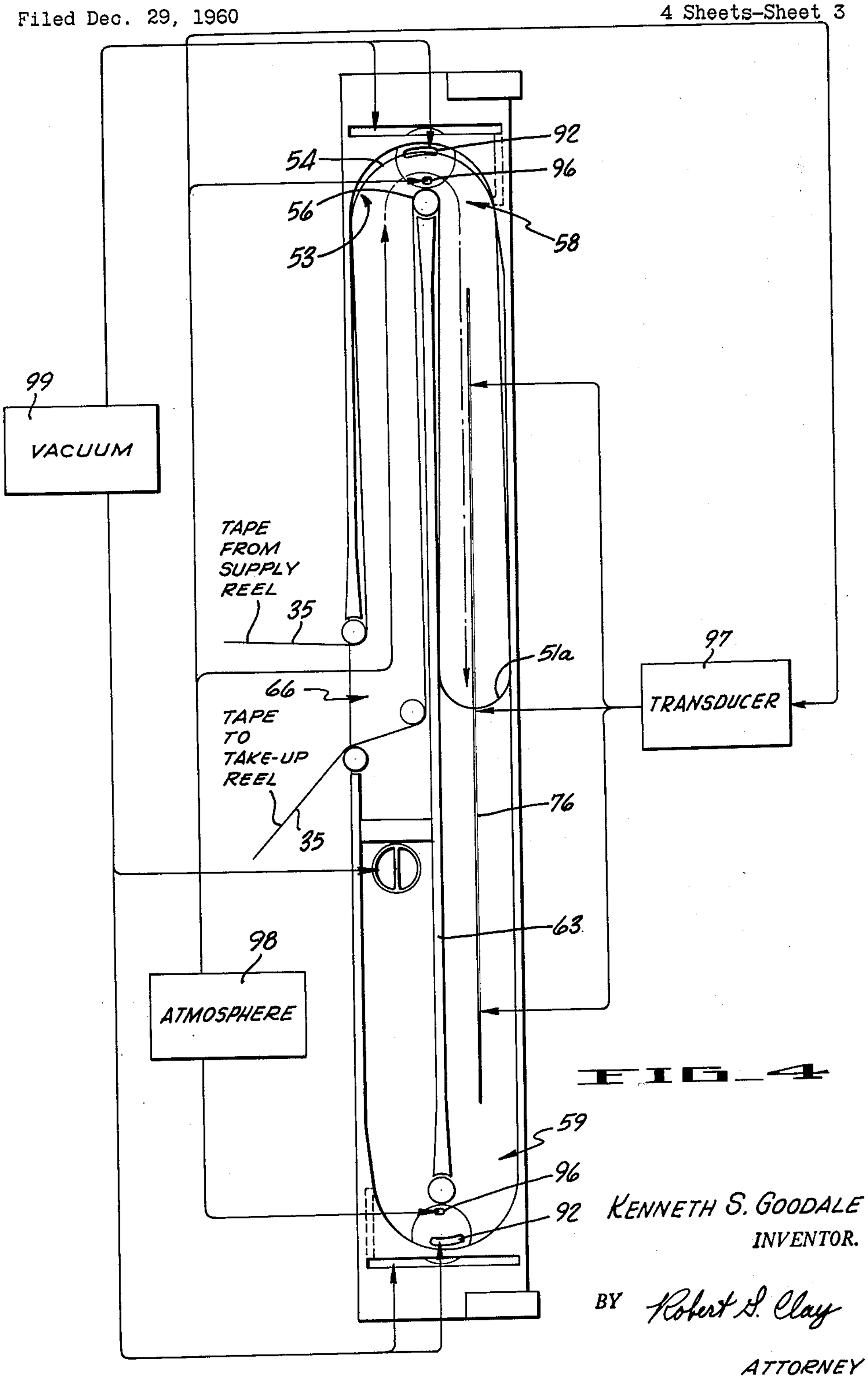
FIGURE 4 is a combined simplified front elevation view and schematic diagram showing the pressure relationships of one of the tape storage devices.

The pneumatic tape-length sensing device operates as follows. As will be seen in FIGURE 4, the slot 76 is normally connected to a pressure transducer 97, which is also connected to a source 98 of atmospheric pressure. The transducer 97 senses the difference between atmospheric pressure and a lower pressure which is in effect the average pressure in the segment of the channel extending the length of the slot 76, as established by the position of the loop end 51. As long as the loop 51 remains between the two bends 58 and 59 of the channel, the transducer senses the length of loop between the bends, the direction of movement, and the speed of movement. When the loop is between the bends, and particularly when the loop is at the "null" point, intermediate the length of the slot 76, the lower pressure that is sensed is midway between the substantially atmospheric pressure that exists within the loop in the upper half of the slotted part of the channel, and the suction pressure in the lower half of the slotted part of the channel. When the tape loop grows shorter, the average pressure sensed through the slot drops because of the increased exposure of the transducer to the suction opening 68 through the lower half of the slot and because of the decreased exposure of the transducer to atmospheric pressure through the upper half of the slot. Similarly, when the tape loop grows longer, the lower or average pressure sensed by the transducer on the vacuum side is increased. Thus, the differential pressure sensed by the transducer between the lower average pressure and atmospheric pressure is decreased and increased accordingly.

The transducer 97 is connected through means well known in the art and not here shown so that when the transducer 97 senses a rapidly decreasing pressure differential, indicating a rapidly shortening loop, a control signal is sent to the reel motor system to operate the reels in such a way as to feed more tape to the loop and to lengthen the loop; and when the transducer sensing indicates a rapidly lengthening loop, the real motors are likewise controlled to compensate and to shorten the loop. This is the way in which the sensing means normally operates when there is no opening 92 in the system.

With the opening 92 in the system, however, a transient error may be introduced in the sensing whenever the loop 51 is withdrawn around the bend 58. It will be seen that one of the pressures from which the differential sensing is measured (i.e., the pressure on the vacuum side) is established by a certain balance of flow and counter-flow of air through the various vacuum and other channels, including those connected to a source 99 of vacuum; and this flow and counter-flow includes flow of air from atmospheric pressure outwardly through the opening 92. The opening 92 constitutes an unavoidable "leak" to the vacuum system, so that when the tape loop is between the bends, the pressure on the vacuum side of the system is not the same as it might be if there were not such a leak. It is important to maintain the vacuum-side pressure that is established because of the leak at an unchanging value so that the pressure differential measured therefrom is measured from an unchanging base. To maintain this value, it is necessary to insure that the atmospheric air supply to opening 92 is never cut off.

However, if and when the tape loop is shortened to the extent that it is withdrawn around the upper bend 58, the upper opening 92 is cut off from the atmospheric pressure supply entering through opening 66 and the pressure on the vacuum side of the apparatus is liable to be transiently altered. Such a pressure alteration on the vacuum side, if sensed by the transducer through the slot 76, would give a false indication to the reel motors to cause them to shorten the loop, instead of lengthen it as they should for proper operation.

Figure 5:
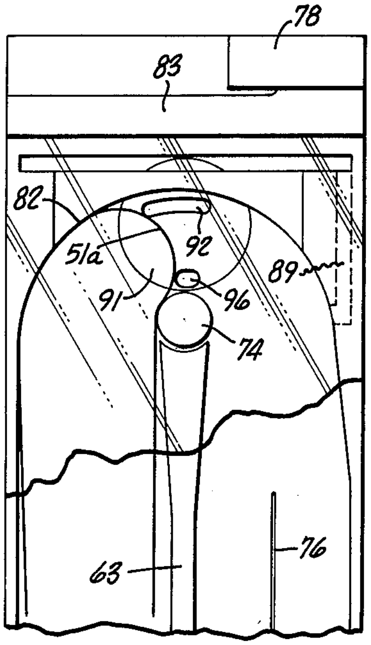
FIGURE 5 is a schematic view, to an enlarged scale, illustrating one position of the tape during movement of the tape in the storage device.
Figure 6:
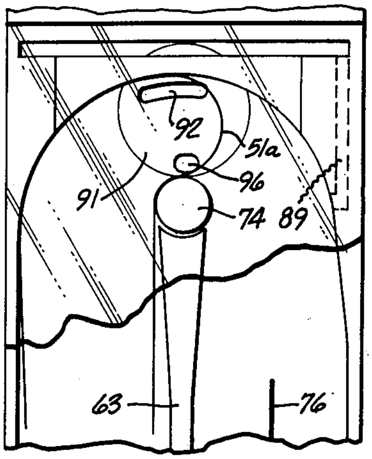
FIGURE 6 is a schematic view showing a second position of the tape during movement.
Figure 7:
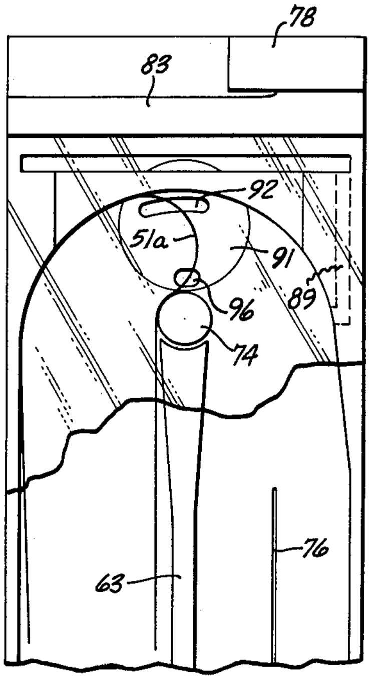
FIGURE 7 is a schematic view showing a third position of the tape during movement.

With the opening 96 in the system, however, atmospheric pressure air is supplied to the leak represented by opening 92 in such a way that opening 92 can never be cut off from atmospheric pressure. Consequently, when the tape loop is withdrawn around the upper bend, no change in pressure on the vacuum side of the system results. The manner in which the opening 96 is used is best illustrated in reference to FIGURES 5–8 as follows:

The tape loop 51 is shown, in FIGURE 5, approaching or leaving the upstream side of the zone of the upper bend that is exposed to the two openings 92 and 96. It is seen that the curve adopted by loop 51 is substantially semi-circular in pattern and is formed on a diameter passing through points of tangency with the roller 74 and the curved wall 82. The openings 92 and 96 are so arranged and proportioned that the leading edge of the loop 51 encounters both of these openings at the same instant. Referring now to FIGURE 6 the tape loop 51 is also shown tangent to the other or downstream portions of both of the openings 92 and 96 at the same instant, when the loop is moving downstream and leaving the zone. FIGURE 7 illustrates intermediate positions of the loop 51 showing the intermediate exposure of opening 92 on both sides of the tape loop, countered by a substantially proportional intermediate exposure of the opening 96 on both sides of the tape loop. Thus the pressure on the vacuum side of the system is preserved without transient variations and false signals to the reel motors are avoided.

Figure 8:
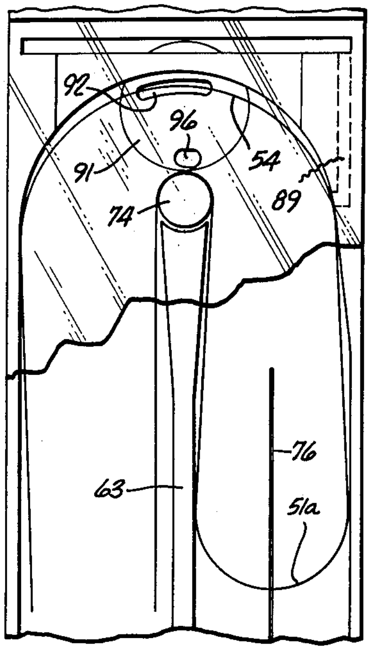
FIGURE 8 is a schematic view showing a fourth position of the tape during movement.

FIGURE 8 illustrates the position of the loop when it is entirely on the downstream side of the bend and shows in greater detail the outer folded portion 54 of the tape loop maintained in alignment lengthwise across the opening 92.

It will be understood that the opening 96 is needed only when the loop-length sensing apparatus is pneumatically operated, and would not be needed when the length of the loop is sensed by other means, because sensing means that do not depend on pneumatic operation would not be affected by transient pressure variations such as those caused by the opening 92.

Thus there has been described a storage device for a tape loop including an elongated tape storage channel with a bend for folding the tape loop; together with means for establishing a pressure differential with a gradient decreasing radially outwardly at the bend so as to maintain the two shanks of the folded portion of the loop spaced substantially apart and away from the walls of the vessel, so that pressure within the loop is maintained substantially constant to keep the tension of the tape in the loop also substantially constant during lengthening and shortening excursions of the loop.

What is claimed is:

1. A storage device for a tape loop, comprising: a pneumatic vessel defining an elongated tape-storage channel with at least one bend; means for feeding said tape loop into a first end of said channel with said loop lying generally in the plane of said bend and with the two shanks of said loop substantially separated at said first end of said channel; means for establishing an air pressure differential with a gradient decreasing from said first to the second end of said channel for drawing said loop tautly toward said second end of said channel and around said bend; and means for establishing an air pressure differential with a gradient decreasing toward a point intermediate the inner and outer peripheries of said bend for separating the two shanks of said tape loop at said bend.

2. A storage device for a tape loop, comprising: a pneumatic vessel including a pair of opposed flat side walls and a pair of intermediate curved walls defining an elongated tape-storage channel with at least one bend, at least one of said side walls having an opening at said bend, said opening being spaced substantially radially outward from the inner periphery of said bend and substantially radially inward from the outer periphery of said bend; means for feeding said tape loop into a first end of said channel with said loop lying generally in the plane of said bend and with the two shanks of said loop each generally parallel to said curved walls and substantially separated at said first end of said channel; means for establishing an air pressure differential with a gradient decreasing from said first to the second end of said channel for drawing said loop tautly toward said second end of said channel and around said bend; and means for establishing an air pressure differential with a gradient decreasing outwardly through said opening for separating the two shanks of said tape loop at said bend.

3. A storage device for a tape loop, comprising: a pneumatic vessel including a pair of opposed flat side walls and a pair of intermediate curved walls defining an elongated tape-storage channel with at least one bend, at least one of said side walls having an opening at said bend, said opening being located intermediately between said curved walls and being spaced substantially from each of said curved walls; means for feeding said tape loop into a first end of said channel with said loop lying generally in the plane of said bend and with the shanks of said loop each generally parallel to and flatly engaging one of said curved walls at said first end of said channel; means for establishing a first air pressure differential with a gradient decreasing from said first to the second end of said channel for drawing said loop tautly toward said second end of said channel and around said bend; and means for establishing a second air pressure differential with a gradient decreasing outwardly through said opening, whereby the shank forming the inner fold of said loop in said bend is drawn tightly against the curved wall having the lesser radius of curvature by the action of said first air pressure differential and whereby the shank forming the outer fold of said loop in said bend is drawn to a position spanning said opening and is separated from the outer shank and from both curved walls by the action of said second air pressure differential.

4. A storage device for a tape loop, comprising: a pneumatic vessel including a pair of opposed flat side walls and a pair of intermediate curved walls defining an elongated tape-storage channel with at least one bend, at least one of said side walls having first and second openings at said bend, said openings being aligned on a radius of said bend and being spaced substantially from one another and from both of said curved walls, said first opening being at a greater radius than said second opening; means for feeding said tape loop into a first end of said channel with said loop lying generally in the plane of said bend and with the shanks of said loop each generally parallel to and flatly engaging one of said curved walls at said first end of said channel; means for establishing a first air pressure differential with a gradient decreasing from said first to the second end of said channel for drawing said loop tautly toward said second end of said channel and around said bend; means for establishing a second air pressure differential with a gradient decreasing outwardly through said first opening; means for establishing an air pressure at said second opening equivalent to the upper pressure value of said first air pressure differential; and means for sensing the average pressure along a predetermined length of said channel between said second end and said bend for providing an indication of the length of said loop in said length of channel, whereby the shanks of said loop are kept separate as said loop is drawn around said bend and whereby the partial exposure of said loop to said second pressure differential as said loop is drawn around said bend produces a transient tendency to error in said indication while the concurrent partial exposure of said loop to said second opening produces a transient correction to said error.

5. A storage device as characterized in claim 4, wherein said openings have downstream edges tangent to the curve formed by said loop entering said bend and upstream edges lying tangent to the curve of said loop in leaving said bend, whereby the partial exposure of said loop to said first opening is always to the same degree as the partial exposure of the loop to said second opening.

6. A storage device for a tape loop, comprising: a pneumatic vessel formed with interior partitions defining at least two elongated cavities lying side-by-side and communicating so as to present a single channel having a plurality of 180-degree bends for the storage of said tape loop in varying lengths and in folded condition thereof; said vessel having a tape inlet open to atmospheric pressure at one end of said channel and a suction outlet at the other end of said channel; said vessel also having a laterally opening arc-shaped port struck about the center of curvature of each of said bends; and means external to said vessel for applying suction to said outlet and to said ports, whereby the shanks of said tape loop are maintained separate when folded around said bends.

7. A storage device for a tape loop, comprising: a pneumatic vessel formed with interior partitions defining at least two elongated cavities lying side-by-side and communicating so as to present a single channel having a plurality of 180-degree bends for the storage of said tape loop in varying lengths and in folded condition thereof; said vessel having a substantially semi-cylindrically curved wall at each of said bends for defining the outer periphery of said channel at said bends; said vessel having a tape inlet open to atmospheric pressure at one end of said channel and a suction outlet at the other end of said channel; said vessel also having a laterally opening arc-shaped port struck about the center of curvature of each of said bends and spaced substantially from the corresponding semi-circularly curved wall; and means external to said vessel for applying suction to said outlet and to said ports, whereby the shanks of said tape loop are maintained separate when folded around said bends, and whereby the major loop of said tape at each of said bends is maintained in spaced relationship with said semi-circularly curved walls so as to avoid rubbing thereon.

8. A storage device for a tape loop, comprising: a pneumatic vessel formed with side walls and interior partitions defining at least two elongated cavities lying side-by-side and communicating so as to present a single channel having a plurality of 180-degree bends for the storage of said tape loop in varying lengths and in folded condition thereof; said vessel having a substantially semi-cylindrically curved wall at each of said bends for defining the outer periphery of said channel at said bends; said vessel having a tape inlet open to atmospheric pressure at one end of said channel and a suction outlet at the other end of said channel; said vessel also having a laterally opening arc-shaped port struck about the center of curvature of each of said bends, each of said ports being located in a side wall of said vessel and generally closer to the corresponding one of said semi-cylindrically curved walls than to the center of curvature of the bend, and each port being spaced substantially from the corresponding semi-cylindrically curved wall of the bend; a plurality of rollers mounted axially parallel to the axes of said bends at opposite sides of said tape inlet and at the center of curvature of each of said bends for guiding the shanks of said tape loop with minimum friction; and means external to said vessel for applying suction to said outlet and to said ports, whereby the shanks of said tape loop are maintained separate when folded around said bends.

9. A storage device for a tape loop, comprising: a pneumatic vessel formed with a pair of flat side walls, a pair of elongated walls, and a first interior partition intermediate said elongated walls, said elongated walls and said first partition being substantially parallel to one another and perpendicular to the plane of said side walls; said vessel also having a pair of semi-cylindrically curved end walls formed with the axes of curvature thereof at the ends of said first partition and connecting said side walls and said elongated walls to define therewith a pair of first and second elongated cavities lying side-by-side and communicating with one another at the ends thereof in a pair of first and second 180-degree bends; said vessel also having a second partition transversely dividing said first cavity into first and second sub-cavities; said vessel also having a tape inlet communicating with said first sub-cavity adjacent to said second partition and a suction outlet communicating with said second sub-cavity adjacent to said second partition so as to define a tape storage channel running from said tape inlet through said first sub-cavity, around said first bend, through said second cavity, around said second bend, and through said second sub-cavity to said suction outlet; said vessel also having a laterally opening arc-shaped port struck about the center of curvature of each of said bends, each of said ports being located in a side wall of said vessel and generally closer to the corresponding one of said semi-cylindrically curved walls than to the center of curvature of the bend, and each port being spaced substantially from the corresponding semi-cylindrically curved wall of the bend; first, second, third and fourth rollers mounted with the axes thereof perpendicular to said side walls, said first roller being mounted on the elongated wall at the side of said tape inlet remote from said second partition, said first roller being particularly located to project into said channel so as to hold said tape away from the wall thereof from said tape inlet at least as far as said first bend; said second roller being mounted between said side walls adjacent said first partition and confronting said tape inlet so as to hold said tape passing between said second roller and said first partition in engagement with said first partition; said third roller being mounted at said first bend at the end of said first partition and extending to both sides of said first partition so as to hold said tape away from said first partition; and said fourth roller being similarly mounted at said second bend at the other end of said first partition; and means external to said vessel for applying atmospheric pressure to said tape inlet and suction to said outlet and to said ports, whereby said loop is drawn into said channel and the shanks of said loop are maintained separate when folded around said bends.

10. In a magnetic tape recorder-reproducer device including a pair of supply and take-up reels and a transducer and capstan assembly mounted therebetween, a pair of tape loop storage devices mounted on either side of said transducer and capstan assembly and between said transducer-capstan assembly and said reels, each of said tape loop storage devices comprising: a pneumatic vessel formed with interior partitions defining at least two elongated cavities lying side-by-side and communicating so as to present a single channel having a plurality of 180-degree bends for the storage of said tape loop in varying lengths and in folded condition thereof; said vessel having a tape inlet open to atmospheric pressure at one end of said channel and a suction outlet at the other end of said channel; said vessel also having a laterally opening arc-shaped port struck about the center of curvature of each of said bends; and means external to said vessel for applying suction to said outlet and to said ports; a first of said vessels being particularly mounted with said tape inlet thereof generally confronting said supply reel and said transducer and capstan assembly; and a second of said vessels being mounted with said tape inlet thereof generally confronting said take-up reel and said transducer and capstan assembly.

References Cited in the file of this patent

UNITED STATES PATENTS 2,980,355 Cannings ______________ Apr. 18, 1961